United States Patent [19]

Takamizawa et al.

[11] 4,024,306

[45] May 17, 1977

[54] METHOD OF PREPARING AN ORGANOPOLYSILOXANE FOR SURFACE COATING

[75] Inventors: Minoru Takamizawa; Akira Abe; Yoshio Inoue; Hiroshi Yoshioka, all of Annaka, Japan

[73] Assignee: Shin-Etsu Chemical Company Limited, Tokyo, Japan

[22] Filed: Mar. 19, 1975

[21] Appl. No.: 560,101

[30] Foreign Application Priority Data

Mar. 25, 1974 Japan .............................. 49-33211

[52] U.S. Cl. ........................... 427/387; 427/407 C; 428/412; 428/447; 428/500; 260/46.5 R; 260/46.5 G; 260/825
[51] Int. Cl.$^2$ ..................... B32B 9/04; C08G 77/04
[58] Field of Search ......... 260/825, 46.5 G, 46.5 R; 428/447, 412, 500; 427/302, 322, 387, 301, 407 C

[56] References Cited

UNITED STATES PATENTS

| | | | |
|---|---|---|---|
| 3,451,838 | 6/1969 | Burzynski | 428/412 |
| 3,650,808 | 3/1972 | Gagnon | 428/412 |
| 3,676,420 | 7/1972 | Fulton | 260/825 |
| 3,707,397 | 12/1972 | Gagnon | 428/412 |
| 3,794,556 | 2/1974 | Young | 428/447 |
| 3,825,618 | 7/1974 | Pepe | 260/46.5 G |
| 3,826,782 | 7/1974 | Lengnick | 260/46.5 G |
| 3,859,320 | 1/1975 | Atherton | 427/387 |

*Primary Examiner*—Michael F. Esposito
*Attorney, Agent, or Firm*—Toren, McGeady and Stanger

[57] ABSTRACT

The coating composition is prepared by partial co-hydrolysis and co-condensation of a mixture comprising an organotrialkoxysilane or its combination with a tetraalkoxysilane, a fluoroalkylalkoxysilane and a hydroxy-endblocked diorganopolysiloxane in the presence of an acid catalyst. The organopolysiloxanes thus prepared are suitable for coating plastic surfaces to produce a coating on the surfaces, the cured coating film having hardness as well as flexibility sufficient to ensure a very strong resistance to swelling, dissolution or corrosion by attacks of solvents and chemicals.

17 Claims, No Drawings

METHOD OF PREPARING AN ORGANOPOLYSILOXANE FOR SURFACE COATING

FIELD OF THE INVENTION

The present invention relates to a method for the preparation of an organopolysiloxane for surface coating, and more particularly to the preparation of an organopolysiloxane suitable for coating plastic surfaces to improve their hardness, anti-abrasion strength and resistance against solvent attack.

DESCRIPTION OF THE PRIOR ART

Articles made from synthetic plastics are widely employed in various fields of applications on account of their advantageous properties such as, for example, light weight, easy processability in fabrication and coloration, and superior impact strength. However, their surfaces disadvantageously tend to produce abrasive scratches and, at the same time, have poor resistance against attacks by solvents and chemicals leading to swelling or dissolution.

These disadvantages have been overcome by a method of covering the plastic surfaces with a hardened film formed from the partial hydrolyzate of a tetraalkoxysilane or an alkyltrialkoxysilane. (See U.S. Pat. Nos. 3,451,838; 3,454,698; 2,404,357 and 2,440,711.) This method, however, has been found dissatisfactory since the hardened films are lacking in flexibility and apt to become cracked on bending or by prolonged heating at a high temperature.

OBJECTS OF THE INVENTION

It is an object of this invention to provide a method for the preparation of an organopolysiloxane suitable for surface coating, free from the above-desceibed drawbacks.

Another object of the invention is to provide plastic surfaces coated with the organopolysiloxane to endure hard services.

SUMMARY OF THE INVENTION

According to the present invention, the organopolysiloxane is prepared by subjecting to partial co-hydrolysis and co-condensation in the presence of an acid catalyst a mixture comprising (A) from 40 to 92% by weight of an organotrialkoxysilane represented by the general formula $R^1Si(OR^2)_3$ where $R^1$ is a monovalent hydrocarbon group and $R^2$ is an alkyl group, or a combination of the organotrialkoxysilane with a tetraalkoxysilane represented by the general formula $Si(OR^3)_4$ where $R^3$ is an alkyl group, (b) from 5 to 40% by weight of a fluoroalkylalkoxysilane represented by the general formula $R^4CH_2CH_2Si(R^5)_a(OR^6)_{3-a}$ where $R^4$ is a perfluoroalkyl group, $R^5$ is a monovalent hydrocarbon group, $R^6$ is an alkyl group and a is an integer of 0,1, or 2, and (c) from 3 to 20% by weight of a diorganopolysiloxane terminated at both chain ends with silanolic hydroxy groups represented by the general formula $HO\{R_2^7Si-O\}_nH$ where $R^7$ is a monovalent hydrocarbon groups and n is an integer from 5 to 2,000. The organopolysiloxane when applied on the surfaces of various substrates including plastics and cured can form films having not only a very high hardness but also excellent flexibility, anti-abrasion strength and resistance against solvent attack.

DETAILED DESCRIPTION OF THE INVENTION

Illustrative of the monovalent hydrocarbon groups as denoted by $R^1$ in the general formula representing the organotrialkoxysilane employed in the preparation of organopolysiloxane according to the present invention are methyl, ethyl, propyl and butyl, alkenyl groups, such as, vinyl and allyl, and aryl groups, such as, phenyl, tolyl and benzyl. Preferably, $R^1$ contains from 1 to 4 carbon atoms. The alkyl groups denoted by $R^2$ in the same formula are also preferred to have from 1 to 4 carbon atoms, and selected from methyl, ethyl, propyl and butyl groups. The organotrialkoxysilanes are exemplified by methyltrimethoxysilane, ethyltriethoxysilane, methyltriethoxysilane, phenyltrimethoxysilane, phenyltriethoxysilane and ethyltributoxysilane. Among them, the most preferred is methyltrimethoxysilane in the method of the present invention.

For the purpose of further increasing the hardness of coating to be obtained, the organotrialkoxysilane may be admixed with a tetraalkoxysilane represented by the general formula $Si(OR^3)_4$ where $R^3$ is the same as $R^2$ above, the tetraalkoxysilanes being exemplified by tetramethoxysilane, tetraethoxysilane, tetrapropoxysilane and tetrabutoxysilane. The admixture of the tetraalkoxysilane and the organotrialkoxysilane can serve to reduce coating costs, since the tetraalkoxysilanes are in general less expensive than the organotrialkoxysilanes. The addition of the tetraalkoxysilane should be in an amount not exceeding 150 parts by weight per 100 parts by weight of the organotrialkoxysilane. Larger amounts may result in improving the hardness of the coating film but, on the other hand, cause disadvantageously to decrease in its flexibility, leading to cracking.

Illustrative of the perfluoroalkyl groups as denoted by $R^4$ in the general formula given above to represent the fluoroalkyl alkoxysilane employed to impart lubricity to the finished coating film are trifluoromethyl pentafluoroethyl, heptafluoropropyl, nonafluorobutyl and undecafluoropentyl groups. Preferably, $R^4$ contains from 1 to 11 carbon atoms. Any larger number of the carbon atoms results to reduce the hardness of the coating film, though its oil-repellency, lubricity and resistance against attacks by solvents and chemicals may be improved. The fluoroalkylalkoxysilanes are exemplified by the following:

$CF_3CH_2CH_2Si(OCH_3)_3$
$CF_3CH_2CH_2Si(OCH_3)_3$
$CF_3CH_2CH_2Si(CH_3)(OCH_3)_2$
$CF_3CF_2CH_2CH_2Si(OCH_3)_3$
$CF_3CF_2CH_2CH_2Si(OC_2H_5)_3$
$CF_3CF_2CF_2CH_2CH_2Si(OCH_3)_3$
$CF_3CF_2CF_2CF_2CH_2CH_2Si(OCH_3)_3$
$CF_3CF_2CF_2CF_2CF_2CH_2CH_2Si(OCH_3)_3$
$CF_3CF_2CF_2CF_2CF_2CF_2CH_2CH_2Si(OCH_3)_3$
$CF_3CF_2CF_2CF_2CF_2CF_2CF_2CH_2CH_2Si(OCH_3)_3$
$CF_3CF_2CF_2CF_2CF_2CF_2CF_2CF_2CH_2CH_2Si(OCH_3)_3$
$CF_3CF_2CF_2CF_2CF_2CF_2CF_2CF_2CF_2CH_2CH_2Si(OCH_3)_3$
$CF_3CF_2CF_2CF_2CF_2CF_2CF_2CF_2CF_2CF_2CH_2CH_2Si(OCH_3)_3$
$CF_3CF_2CF_2CF_2CF_2CF_2CF_2CF_2CF_2CF_2CF_2CH_2CH_2Si(OCH_3)_3$

Next, the monovalent hydrocarbon groups as denoted by $R^7$ in the general formula representing the diorganopolysiloxane according to the invention are bonded to the same silicon atom and two in number.

One of the two is preferably a methyl group, while the other is any one of monovalent hydrocarbon groups, such as methyl, ethyl, propyl, butyl, vinyl, and phenyl. In the same general formula the value of n which is from 5 to 2,000 in general is preferably from 10 to 25. The polysiloxane is composed of, for example, dimethyl siloxane unit, methylethylsiloxane unit, methylphenylsiloxane unit or methylvinylsiloxane unit, and terminated with silanolic hydroxy groups at both chain ends.

The method of the present invention is performed by the partial co-hydrolysis and co-condensation, in the presence of an acid catalyst, of a mixture comprising components (a), (b) and (c) above in the specific ratios of from 40 to 92% by weight of component (a), from 5 to 40% by weight of component (b) and from 3 to 20% by weight of component (c). Any smaller amounts of component (a) than 40% result in insufficient hardness of the film, while any amounts larger than 92% by weight result in the lack of flexibility in the films. Any smaller amounts of component (b) than 5% by weight cannot give sufficient lubricity to the film, while any larger amounts of it than 40% by weight bring about lowering in the hardness of the film.

The acid catalyst suitable in the method of the present invention is usually a mineral acid, such as sulfuric acid, hydrochloric acid and phosphoric acid, although several of the organic acids having a relatively strong acidity, such as p-toluenesulfonic acid and trichloroacetic acid, may be employed successfully in some cases.

The mixture of the above components (a), (b) and (c) may be diluted with an organic solvent or solvents in the processes of the partial co-hydrolysis and the co-condensation, if necessary. Suitable solvents are exemplified by lower alcohols, such as methanol, ethanol, propanol and butanol, and mixed solvents of those lower alcohols with high-boiling solvents, such as ethyleneglycol, diethyleneglycol monomethylether, dipropyleneglycol monomethylether and diethyleneglycol monobutylether. By use of a solvent as mentioned above, the coating composition is obtained in the form of an organic solution, and the solution can easily be applied on the surfaces of various substrates by way of brush coating, dipping, roller coating, spraying or flow coating followed by heating of the coated articles at a temperature from room temperature to 80° C.

The organopolysiloxane prepared according to the method of the invention may be admixed, if desired, with several kinds of additives including hardening accelerators, surface active agents and pigments. The hardening accelerators include a carboxylate of a metal, such as, tin, iron, lead, antimony, cadmium, titanium, calcium, bismuth and zirconium and an amine, such as, triethanolamine, triethyllenediamine and dimethylphenylamine. A preferred surface active agent is a copolymer of dimethylsiloxane and an alkylene oxide. It is recommended that the surface of, for example, plastics is treated with a primer before the coating composition is applied thereto. Suitable primers include a mixture of an aminosilane and an epoxysilane and a solution of a copolymer of a methacryloxysilane and an acrylic acid ester.

The organopolysiloxane of the present invention is suitable for coating the various surfaces of plastic resins, such as, polymethylmethacrylate, polycarbonate, polyvinylchloride and polystyrene in the form of a film, sheet, plate, lens, etc. The thus coated surfaces will possess extremely high hardness so that they are resistant to abrasive scratches. The films thus formed on the surface are excellent also in flexibility and free from cracking or bending.

Following are the examples to illustrate the present invention in which parts are all in parts by weight. The primer employed in the example was prepared by the following procedure.

To a boiling mixture of 100 g of toluene and 100 g of isopropanol under reflux was added a mixture of 140 g of methyl methacrylate, 20 g of ethylacrylate, 40 g of 3-methacryloxypropyl trimethoxysilane and 1.6 g of dibenzoyl peroxide dropwise over a period of 2 hours, and the boiling under reflux was contained for a further 8 hours. Then the mixture was cooled, and 150 g of toluene and 150 g of isopropanol were added to give a primer solution ready for use.

EXAMPLE 1.

Into a mixture of 60 parts of methyltrimethoxysilane, 25 parts of tetraethoxysilane, 10 parts of trifluoropropyltrimethoxysilane and 5 parts of hydroxy-endblocked dimethylpolysiloxane with a polymerization degree of 13 under agitation at room temperature, 8 parts of 2% sulfuric acid were slowly added dropwise. The resultant mixture was aged by standing at room temperature for a further 8 hours to give an organopolysiloxane coating.

The organopolysiloxane was coated on a polymethylmethacrylate resin plate 1 mm thick, treated in advance with the primer, by dipping. The thus coated plate was heated in a hot-air oven at 80° C for 30 minutes to harden the coating hardened by curing to give a transparent film. The adherence between the cured film and the resin plate was very strong. The film exhibited excellent resistance against water, solvents and chemicals. Its hardness was found to be 9H according to pencil hardness. The coated plate could be wound on a mandrel 4 mm in diameter without causing any cracks on the film at all.

The anti-abrasion strength of the film was tested by use of a paper abrasion tester with a sandpaper (grade: CS 10) under a load of 250 g rubbing the surface of the film. The number of revolutions until the film surface became covered with abrasive scratches were from 70 to 250 in several repeated tests, whereas the untreated bare surface of the polymethylmethacrylate plate became covered with abrasive scratches by only 1 to 3 revolutions.

EXAMPLE 2

The same organopolysiloxane as employed in the preceeding example was applied to the surface of a polycarbonate resin plate 1 mm thick treated in a advance with the primer by dipping, followed by heating in a hotair oven at 80° C for 30 minutes to harden the coating film by curing. The cured film was transparent, and found to have a strong adherence to the polycarbonate plate as well as excellent resistance against water, solvents, and chemicals. Its hardness was on the 9H level according to pencil hardness.

EXAMPLE 3

Into each of the mixtures of methyltrimethoxysilane, tetraethoxysilane, trifluoropropyltrimethoxysilane and hydroxy-endblocked dimethylpolysiloxane with a polymerization degree of 20 in the amounts specified in Table I under agitation, 8.8 parts of 2% sulfuric acid were added slowly dropwise, followed by aging for 8 hours at room temperature, to produce an organopolysiloxane coating.

Each organopolysiloxane sample thus obtained was applied onto the surface of a polymethacrylate resin plate 1 mm thick treated in advance with the primer by dipping, followed by heating in a hot-air oven at 80° C for 30 minutes to hardened the coating film by curing. The cured films thus formed were subjected to tests to determine their adherence to substrates, pencil hardness and anti-abrasion strength as well as observation as to surface appearance just after the heat cure and after the bending test using a mandrel 4 mm in diameter. The results are set out in the same table.

EXAMPLE 5

To 10 parts of heptafluoropentyltrimethoxysilane and 10 parts of hydroxy-endblocked dimethylpolysiloxane having a polymerization degree of 20 were added methyltrimethoxysilane and tetraethoxysilane in the amounts as specified in Table III. To each mixture, under agitation, 8 parts of 2% sulfuric acid, were added slowly dropwise, followed by aging at room temperature for 8 hours, to produce an organopolysiloxanes ready for coating use.

The organopolysiloxane samples thus obtained were coated with the same primer-coated polymethylmeth-

TABLE I

| Sample No. | Present Invention | | | | | | | Control | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Methyltrimethoxysilane, parts | 60 | 60 | 50 | 40 | 40 | 85 | 92 | 60 | 60 | 40 | 40 | 30 | 30 | 94 |
| Tetraethoxysilane, parts | 20 | 10 | 25 | 25 | 30 | 0 | 0 | 40 | 30 | 5 | 25 | 55 | 55 | 0 |
| Trifluoropropyltrimethoxysilane, parts | 10 | 20 | 20 | 30 | 10 | 10 | 5 | 0 | 10 | 50 | 10 | 10 | 5 | 2 |
| OH-endblocked dimethylpolysiloxane, parts | 10 | 10 | 5 | 5 | 20 | 5 | 3 | 0 | 0 | 5 | 25 | 5 | 5 | 2 |
| Appearance just after heat cure | Good | Good | Good | Good | Good | Good | Good | * | Good | Good | Good | Good | * | Good |
| Adherence of the film to substrate | Good | Good | Good | Good | Good | Good | Good | Good | Good | Good | Good | Good | Good | Good |
| Pencil Hardness | 8–9H | 8–9H | 9H | 8–9H | 8H | 8–9H | 9H | 9H | 9H | 7H | 6H | 9H | 9H | 9H |
| Appearance after the bending test | Good | Good | Good | Good | Good | Good | Good | * | * | Good | Good | * | * | * |
| Anti-abrasion strength, revolutions | 325–350 | 350–375 | 375–400 | 400–425 | 375–400 | 300–325 | 325–350 | 250–275 | 350–375 | 325–350 | 275–300 | 350–375 | 325–350 | 325–350 |

*Cracking appearing

EXAMPLE 4

To 30 parts of tetraethoxysilane, 5 parts of hydroxy-endblocked dimethylpolysiloxane with a polymerization degree of 15 were added methyltrimethoxysilane and trifluoropropyltrimethoxysilane in the amounts as specified in Table II. To each mixture, under agitation, 8 parts of 2% sulfuric acid were added slowly dropwise, followed by aging at room temperature for 8 hours to produce an organopolysiloxane ready for coating use.

The organopolysiloxane samples thus obtained were applied on the primer-treated polymethylmethacrylate resin plates 1 mm thick, followed by the same heating and testing or observance procedures as in Example 3. The results of the tests and observance are set out in Table II.

TABLE II

| | Present Invention | |
|---|---|---|
| Sample No. | 15 | 16 |
| Methyltrimethoxysilane, Parts | 50 | 40 |
| Trifluoropropyltrimethoxysilane, parts | 15 | 40 |
| Appearance just after heat cure | Good | Good |
| Adherence of the film to substrate | Good | Good |
| Pencil Hardness | 9H | 7–8H |
| Appearance after the bending test | Good | Good |
| Anti-abrasion strength, revolutions | 375–400 | 375–400 | acrylate plate and the same heat-treatment and testing or observance procedures as in Example 3. The results of the tests and observance are set out in Table III.

TABLE III

| | Present Invention | |
|---|---|---|
| Sample No. | 17 | 18 |
| Methyltrimethoxysilane, parts | 40 | 80 |
| Tetraethoxysilane, parts | 40 | 0 |
| Appearance just after heat cure | Good | Good |
| Adherence of the film to substrate | Good | Good |
| Pencil Hardness | 9H | 8H |
| Appearance after the bending test | Good | Good |
| Anti-abrasion strength, revolutions | 325–350 | 300–325 |

What is claimed is:

1. A method for the preparation of an organopolysiloxane which comprises partial co-hydrolysis and co-condensation, in the presence of an acid catalyst, of a mixture comprising (a) from 40 to 92% by weight of an organotrialkoxysilane represented by the general formula $R^1Si(OR^2)_3$ where $R^1$ is a monovalent hydrocarbon groups and $R^2$ is an alkyl group or a combination of said organotrialkoxysilane with a tetraalkoxysilane represented by the general formula $Si(OR^3)_4$ where $R^3$ is an alkyl group, (b) from 5 to 40% by weight of a fluoroalkylalkoxysilane represented by the general formula $R^4CH_2CH_2Si(R^5)_a(OR^6)_{3-a}$ where $R^4$ is a perfluoroalkyl group, $R^5$ is a monovalent hydrocarbon group, $R^6$ is an alkyl group and a is an integer of 0, 1 or 2, and (c) from 3 to 20% by weight of a diorganopolysiloxane terminated at both chain ends with silanolic hydroxy groups represented by the general formula $HO(R_2^7Si-O)_nH$ where $R^7$ is a monovalent hydrocarbon group and n is an integer from 5 to 2,000.

2. The method as claimed in claim 1 wherein said monovalent hydrocarbon group $R^1$ is selected from the class consisting of alkyl, alkenyl, and aryl groups.

3. The method as claimed in claim 1 wherein said alkyl group $R^2$ is selected from the class consisting of methyl, ethyl, propyl, and butyl groups.

4. The method as claimed in claim 1 wherein said alkyl group $R^3$ is selected from the class consisting of methyl, ethyl, propyl, and butyl groups.

5. The method as claimed in claim 1 wherein said organotrialkoxysilane is selected from the glass consisting of methyltrimethoxysilane, ethyltriethoxysilane, methyltriethoxysilane, phenyltrimethoxysilane, phenyltriethoxysilane and ethyltributoxysilane.

6. The method as claimed in claim 1 wherein said combination of organotrialkoxysilane with tetraalkoxysilane consists of an amount not exceeding 150 parts by weight of said tetraalkoxysilane per 100 parts by weight of said organotrialkoxysilane.

7. The method as claimed in claim 1 wherein said perfluoroalkyl group $R^4$ is selected from the perfluoroalkyl groups having from 1 to 11 carbon atoms.

8. The method as claimed in claim 1 wherein n is an integer from 10 to 25.

9. The method as claimed in claim 1 wherein one of said monovalent hydrocarbon groups $R^7$ bonded to the same silicon atom is a methyl group and the other one is selected from the class consisting of methyl, ethyl, propyl, butyl, vinyl, and phenyl groups.

10. The method as claimed in claim 1 wherein said acid catalyst is selected from the class consisting of sulfuric acid, hydrochloric acid, and phosphoric acid.

11. The method as claimed in claim 1 wherein said partial co-hydrolysis and co-condensation are carried out in the presence of an organic solvent.

12. The method as claimed in claim 11 wherein said organic solvent is an alcohol selected from the class consisting of methanol, ethanol, propanol, and butanol.

13. The method as claimed in claim 11 wherein said organic solvent is a mixture of an alcohol and a high-boiling solvent selected from the class consisting of ethyleneglycol, diethyleneglycol monomethylether, dipropyleneglycol monomethylether, and diethyleneglycol monobutylether.

14. An organopolysiloxane prepared in accordance with the method as claimed in claim 1.

15. The method for coating a plastic surface which comprises treating said surface with a primer, applying to the surface thus treated the organopolysiloxane of claim 14 and curing said organopolysiloxane by heating at a temperature from room temperature to 80° C, to produce a coating on the surface.

16. An article of manufacture comprising a plastic surface coated with the organopolysiloxane of claim 14.

17. The article of manufacture as claimed in claim 16 wherein said plastic is a selected from the class consisting of polymethylmethacrylate, polyvinylchloride, polycarbonate, and polystyrene.

* * * * *